US012712889B2

(12) United States Patent
De Leon

(10) Patent No.: US 12,712,889 B2
(45) Date of Patent: Aug. 18, 2026

(54) DETECTING EXECUTION OF A WEB SHELL

(71) Applicant: PALO ALTO NETWORKS (ISRAEL ANALYTICS) LTD., Tel Aviv (IL)

(72) Inventor: Gal De Leon, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 186 days.

(21) Appl. No.: 18/322,231

(22) Filed: May 23, 2023

(65) Prior Publication Data

US 2024/0396904 A1 Nov. 28, 2024

(51) Int. Cl.
*H04L 9/40* (2022.01)

(52) U.S. Cl.
CPC ...... *H04L 63/1416* (2013.01); *H04L 63/1466* (2013.01)

(58) Field of Classification Search
CPC ........................ H04L 63/1416; H04L 63/1466
USPC ............................................................ 726/23
See application file for complete search history.

(56) References Cited

U.S. PATENT DOCUMENTS 5,991,881 A 11/1999 Conklin et al.
6,347,374 B1 2/2002 Drake et al.
6,704,874 B1 3/2004 Porras et al.
7,003,790 B1 2/2006 Inoue et al.
7,007,301 B2 2/2006 Crosbie et al.
7,178,164 B1 2/2007 Bonnes
7,181,769 B1 2/2007 Keanini et al.
7,523,016 B1 4/2009 Surdulescu et al.
7,684,568 B2 3/2010 Yonge, III et al.
7,694,150 B1 4/2010 Kirby
(Continued)

FOREIGN PATENT DOCUMENTS

CA 3041875 A1 11/2019
CN 1612532 A 5/2005
(Continued)

OTHER PUBLICATIONS

Yifan Tian; CNN-Webshell: Malicious Web Shell Detection; ACM; 201, pp. 75-79.*
(Continued)

*Primary Examiner* — Monjur Rahim
(74) *Attorney, Agent, or Firm* — Meitar Patents Ltd.; Daniel Kligler

(57) ABSTRACT

A method includes placing a first hook on a page-executing function configured to execute a web page on a web server, and placing a second hook on at least one sensitive function. The first hook is configured to ascertain whether the page-executing function is called to execute a server-side script, and in response to the page-executing function being called to execute a server-side script, associate, with a current execution thread, data associated with the calling of the page-executing function and indicating that the page-executing function is called to execute the server-side script. The second hook is configured to ascertain whether the sensitive function is called from an execution thread associated with the data, and in response to the sensitive function being called from an execution thread associated with the data, output a message including the data. Other embodiments are also described.

30 Claims, 3 Drawing Sheets

(56) References Cited

U.S. PATENT DOCUMENTS 7,703,138 B2 4/2010 Desai et al.
7,712,134 B1 5/2010 Nucci et al.
7,752,665 B1 7/2010 Robertson et al.
7,908,655 B1 3/2011 Bhattacharyya et al.
8,245,298 B2 8/2012 Pletka et al.
8,397,284 B2 3/2013 Kommareddy et al.
8,429,180 B1 4/2013 Sobel et al.
8,490,190 B1 7/2013 Hernacki et al.
8,516,573 B1 8/2013 Brown et al.
8,516,586 B1 8/2013 Jensen et al.
8,555,388 B1 10/2013 Wang et al.
8,578,345 B1 11/2013 Kennedy et al.
8,607,353 B2 12/2013 Rippert, Jr. et al.
8,620,942 B1 12/2013 Hoffman et al.
8,677,487 B2 3/2014 Balupari et al.
8,762,288 B2 6/2014 Dill
8,769,681 B1 7/2014 Michels et al.
8,925,095 B2 12/2014 Herz et al.
8,966,625 B1 2/2015 Zuk et al.
9,038,178 B1 5/2015 Lin
9,118,582 B1 8/2015 Martini
9,147,071 B2 9/2015 Sallam
9,231,962 B1 1/2016 Yen et al.
9,319,421 B2 4/2016 Ferragut et al.
9,342,691 B2 5/2016 Maestas
9,378,361 B1 6/2016 Yen et al.
9,386,028 B2 7/2016 Altman
9,531,614 B1 12/2016 Nataraj et al.
9,531,736 B1 12/2016 Torres et al.
9,690,606 B1 * 6/2017 Ha ...................... G06F 9/45558
9,690,933 B1 6/2017 Singh et al.
9,736,251 B1 8/2017 Samant et al.
9,773,112 B1 9/2017 Rathor et al.
9,979,739 B2 5/2018 Mumcuoglu et al.
9,979,742 B2 5/2018 Mumcuoglu et al.
10,027,694 B1 7/2018 Gupta et al.
10,075,461 B2 9/2018 Mumcuoglu et al.
10,140,453 B1 11/2018 Fridakis
10,181,032 B1 1/2019 Sadaghiani et al.
10,237,875 B1 3/2019 Romanov
10,360,367 B1 7/2019 Mossoba et al.
10,423,789 B2 9/2019 Barak
10,587,642 B1 3/2020 Herman-Saffar et al.
10,706,144 B1 7/2020 Moritz et al.
10,728,262 B1 7/2020 Vaswani et al.
10,728,281 B2 7/2020 Kurakami
10,873,596 B1 12/2020 Bourget et al.
10,904,277 B1 1/2021 Sharifi Mehr
11,070,573 B1 * 7/2021 Edwards ............. H04L 63/1433
11,100,199 B2 8/2021 Subramaniam
11,140,194 B2 10/2021 Hecht
11,178,168 B1 11/2021 Lin et al.
11,277,423 B2 3/2022 Brown
11,501,261 B1 11/2022 Schemers et al.
11,509,680 B2 11/2022 Steimberg et al.
11,956,253 B1 4/2024 Lin et al.
12,045,610 B1 7/2024 Myers et al.
12,380,389 B2 8/2025 Schmidt ............. G06Q 10/0635
2002/0059078 A1 5/2002 Valdes et al.
2002/0133586 A1 9/2002 Shanklin et al.
2003/0110396 A1 6/2003 Lewis et al.
2003/0133443 A1 7/2003 Klinker et al.
2004/0003286 A1 1/2004 Kaler et al.
2004/0015728 A1 1/2004 Cole et al.
2004/0117658 A1 6/2004 Klaes
2004/0199793 A1 10/2004 Wilken et al.
2004/0210769 A1 10/2004 Radatti et al.
2004/0250169 A1 12/2004 Takemori et al.
2004/0260733 A1 12/2004 Adelstein et al.
2005/0015624 A1 1/2005 Ginter et al.
2005/0018618 A1 1/2005 Mualem et al.
2005/0060295 A1 3/2005 Gould et al.
2005/0069130 A1 3/2005 Kobayashi
2005/0071330 A1 3/2005 Douceur et al.
2005/0123138 A1 6/2005 Abe et al.
2005/0128989 A1 6/2005 Bhagwat et al.
2005/0183120 A1 8/2005 Jain et al.
2005/0216749 A1 9/2005 Brent
2005/0262556 A1 11/2005 Waisman et al.
2005/0262560 A1 11/2005 Gassoway
2005/0268112 A1 12/2005 Wang et al.
2005/0286423 A1 12/2005 Poletto et al.
2006/0018466 A1 1/2006 Adelstein et al.
2006/0075462 A1 4/2006 Golan
2006/0075492 A1 4/2006 Golan et al.
2006/0075500 A1 4/2006 Bertman et al.
2006/0107321 A1 5/2006 Tzadikario
2006/0126522 A1 6/2006 Oh
2006/0136720 A1 6/2006 Armstrong et al.
2006/0137009 A1 6/2006 Chesla
2006/0149848 A1 7/2006 Shay
2006/0156398 A1 7/2006 Ross et al.
2006/0161984 A1 7/2006 Phillips et al.
2006/0190803 A1 8/2006 Kawasaki et al.
2006/0191010 A1 8/2006 Benjamin
2006/0215627 A1 9/2006 Waxman
2006/0242694 A1 10/2006 Gold et al.
2006/0259967 A1 11/2006 Thomas et al.
2006/0282893 A1 12/2006 Wu et al.
2007/0011319 A1 1/2007 McClure et al.
2007/0072661 A1 3/2007 Lototski
2007/0073519 A1 3/2007 Long
2007/0116277 A1 5/2007 Ro et al.
2007/0124474 A1 5/2007 Margulis
2007/0198603 A1 8/2007 Tsioutsiouliklis et al.
2007/0201691 A1 8/2007 Kumagaya
2007/0201693 A1 8/2007 Ohno
2007/0218874 A1 9/2007 Sinha et al.
2007/0226796 A1 9/2007 Gilbert et al.
2007/0226802 A1 9/2007 Gopalan et al.
2007/0245420 A1 10/2007 Yong et al.
2007/0255724 A1 11/2007 Jung et al.
2007/0283166 A1 12/2007 Yami et al.
2008/0005782 A1 1/2008 Aziz
2008/0013725 A1 1/2008 Kobayashi
2008/0016339 A1 * 1/2008 Shukla .................... G06F 21/54
713/164
2008/0016570 A1 1/2008 Capalik
2008/0104046 A1 5/2008 Singla et al.
2008/0104703 A1 5/2008 Rihn et al.
2008/0134296 A1 6/2008 Amitai et al.
2008/0148381 A1 6/2008 Aaron
2008/0198005 A1 8/2008 Schulak et al.
2008/0244097 A1 10/2008 Candelore et al.
2008/0262991 A1 10/2008 Kapoor et al.
2008/0271143 A1 10/2008 Stephens et al.
2008/0285464 A1 11/2008 Katzir
2008/0301567 A1 12/2008 Martin et al.
2009/0007100 A1 1/2009 Field et al.
2009/0007220 A1 1/2009 Ormazabal et al.
2009/0115570 A1 5/2009 Cusack, Jr.
2009/0157574 A1 6/2009 Lee
2009/0164522 A1 6/2009 Fahey
2009/0193103 A1 7/2009 Small et al.
2009/0265777 A1 10/2009 Scott
2009/0320136 A1 12/2009 Lambert et al.
2010/0014594 A1 1/2010 Beheydt
2010/0054241 A1 3/2010 Shah et al.
2010/0071063 A1 3/2010 Wang et al.
2010/0107257 A1 4/2010 Ollmann
2010/0146292 A1 6/2010 Shi et al.
2010/0146293 A1 6/2010 Shi et al.
2010/0146501 A1 6/2010 Wyatt et al.
2010/0162400 A1 6/2010 Feeney et al.
2010/0197318 A1 8/2010 Petersen et al.
2010/0212013 A1 8/2010 Kim et al.
2010/0217861 A1 8/2010 Wu
2010/0235915 A1 9/2010 Memon et al.
2010/0268818 A1 10/2010 Richmond et al.
2010/0272257 A1 10/2010 Beals
2010/0278054 A1 11/2010 Dighe
2010/0280978 A1 11/2010 Shimada et al.
2010/0284282 A1 11/2010 Golic
2010/0299430 A1 11/2010 Powers et al.

(56) References Cited

U.S. PATENT DOCUMENTS

2011/0026521 A1 2/2011 Gamage et al.
2011/0035795 A1 2/2011 Shi
2011/0087779 A1 4/2011 Martin et al.
2011/0125770 A1 5/2011 Battestini et al.
2011/0135090 A1 6/2011 Chan et al.
2011/0138463 A1 6/2011 Kim et al.
2011/0153748 A1 6/2011 Lee et al.
2011/0185055 A1 7/2011 Nappier et al.
2011/0185421 A1 7/2011 Wittenstein et al.
2011/0214187 A1 9/2011 Wittenstein et al.
2011/0247071 A1 10/2011 Hooks et al.
2011/0265011 A1 10/2011 Taylor et al.
2011/0270957 A1 11/2011 Phan et al.
2011/0271343 A1 11/2011 Kim et al.
2011/0302653 A1 12/2011 Frantz et al.
2011/0317770 A1 12/2011 Lehtiniemi et al.
2012/0042060 A1 2/2012 Jackowski et al.
2012/0079596 A1* 3/2012 Thomas .............. H04L 63/1433 726/24
2012/0102359 A1 4/2012 Hooks
2012/0136802 A1 5/2012 Mcquade et al.
2012/0137342 A1 5/2012 Hartrell et al.
2012/0143650 A1 6/2012 Crowley et al.
2012/0191660 A1 7/2012 Hoog
2012/0222120 A1 8/2012 Rim et al.
2012/0233311 A1 9/2012 Parker et al.
2012/0240185 A1 9/2012 Kapoor et al.
2012/0275505 A1 11/2012 Tzannes et al.
2012/0308008 A1 12/2012 Kondareddy et al.
2012/0331553 A1 12/2012 Aziz et al.
2013/0031037 A1 1/2013 Brandt et al.
2013/0031600 A1 1/2013 Luna et al.
2013/0061045 A1 3/2013 Kiefer et al.
2013/0083700 A1 4/2013 Sndhu et al.
2013/0097706 A1 4/2013 Titonis et al.
2013/0111211 A1 5/2013 Winslow et al.
2013/0196549 A1 8/2013 Sorani
2013/0298237 A1 11/2013 Smith
2013/0298243 A1 11/2013 Kumar et al.
2013/0333041 A1 12/2013 Christodorescu et al.
2014/0010367 A1 1/2014 Wang
2014/0013434 A1 1/2014 Ranum et al.
2014/0165207 A1 6/2014 Engel et al.
2014/0198669 A1 7/2014 Brown et al.
2014/0201776 A1 7/2014 Minemura et al.
2014/0215619 A1* 7/2014 Lee .................... H04L 63/1483 726/23
2014/0230059 A1 8/2014 Wang
2014/0325643 A1 10/2014 Bart et al.
2015/0026810 A1 1/2015 Friedrichs et al.
2015/0032884 A1 1/2015 Greifender et al.
2015/0040219 A1 2/2015 Garraway et al.
2015/0047032 A1 2/2015 Hannis et al.
2015/0071308 A1 3/2015 Webb, III et al.
2015/0121461 A1 4/2015 Dulkin et al.
2015/0156270 A1 6/2015 Teraoka et al.
2015/0180883 A1 6/2015 Aktas et al.
2015/0195300 A1 7/2015 Adjaoute
2015/0207694 A1 7/2015 Inches et al.
2015/0264069 A1 9/2015 Beauchesne et al.
2015/0295903 A1 10/2015 Yi et al.
2015/0304346 A1 10/2015 Kim
2015/0324188 A1 11/2015 Raje et al.
2015/0341380 A1 11/2015 Heo et al.
2015/0341389 A1 11/2015 Kurakami
2015/0356451 A1 12/2015 Gupta et al.
2016/0021141 A1 1/2016 Liu et al.
2016/0028758 A1 1/2016 Ellis et al.
2016/0119292 A1 4/2016 Kaseda et al.
2016/0127390 A1 5/2016 Lai et al.
2016/0142746 A1 5/2016 Schuberth
2016/0191918 A1 6/2016 Lai et al.
2016/0234167 A1 8/2016 Engel et al.
2016/0247163 A1 8/2016 Donsky et al.
2016/0315954 A1 10/2016 Peterson et al.
2016/0323299 A1 11/2016 Huston, III
2016/0359895 A1 12/2016 Chiu et al.
2017/0007128 A1 1/2017 Takano et al.
2017/0026387 A1 1/2017 Vissamsetty et al.
2017/0026395 A1 1/2017 Mumcuoglu et al.
2017/0054744 A1 2/2017 Mumcuoglu et al.
2017/0063912 A1 3/2017 Muddu et al.
2017/0063921 A1 3/2017 Fridman et al.
2017/0078312 A1 3/2017 Yamada et al.
2017/0111376 A1 4/2017 Friedlander et al.
2017/0171229 A1 6/2017 Arzi et al.
2017/0171231 A1 6/2017 Reybok et al.
2017/0262633 A1 9/2017 Miserendino et al.
2017/0289178 A1 10/2017 Roundy et al.
2017/0294112 A1 10/2017 Kushnir
2017/0295190 A1 10/2017 Brown
2017/0374090 A1 12/2017 McGrew et al.
2018/0004948 A1 1/2018 Martin et al.
2018/0007013 A1 1/2018 Wang
2018/0048662 A1 2/2018 Jang et al.
2018/0075240 A1 3/2018 Chen
2018/0077189 A1 3/2018 Doppke et al.
2018/0288081 A1 10/2018 Yermakov
2018/0332064 A1 11/2018 Harris et al.
2018/0365416 A1 12/2018 Monastyrsky et al.
2018/0373820 A1 12/2018 Knezevic et al.
2019/0036978 A1 1/2019 Shulman-Peleg et al.
2019/0044963 A1 2/2019 Rajasekharan et al.
2019/0044965 A1 2/2019 Pilkington et al.
2019/0065738 A1 2/2019 Kim et al.
2019/0068620 A1 2/2019 Avrahami et al.
2019/0075344 A1 3/2019 Brown
2019/0098025 A1 3/2019 Lim
2019/0207966 A1 7/2019 Vashisht et al.
2019/0268361 A1 8/2019 Blewett et al.
2019/0297097 A1 9/2019 Gong et al.
2019/0319981 A1 10/2019 Meshi et al.
2019/0334931 A1 10/2019 Arlitt et al.
2020/0007566 A1 1/2020 Wu
2020/0033144 A1 1/2020 Du et al.
2020/0065483 A1 2/2020 Mu et al.
2020/0082296 A1 3/2020 Fly et al.
2020/0136889 A1 4/2020 Chen et al.
2020/0137085 A1 4/2020 Kostyushko et al.
2020/0145435 A1 5/2020 Chiu et al.
2020/0162252 A1 5/2020 Davis et al.
2020/0162494 A1 5/2020 Rostami-Hesarsorkh
2020/0167491 A1 5/2020 Grabois et al.
2020/0193019 A1 6/2020 Tietz et al.
2020/0195673 A1 6/2020 Lee
2020/0244658 A1 7/2020 Meshi et al.
2020/0244675 A1 7/2020 Meshi et al.
2020/0244676 A1 7/2020 Amit et al.
2020/0244683 A1 7/2020 Meshi et al.
2020/0244684 A1 7/2020 Meshi et al.
2020/0274880 A1 8/2020 Badawy et al.
2020/0274894 A1 8/2020 Argoeti et al.
2020/0285737 A1 9/2020 Kraus et al.
2020/0293917 A1 9/2020 Wang et al.
2020/0327221 A1 10/2020 Street
2020/0327225 A1 10/2020 Nguyen et al.
2020/0342230 A1 10/2020 Tsai et al.
2020/0374301 A1 11/2020 Manevich et al.
2020/0404007 A1* 12/2020 Singh ................ G06F 16/24537
2021/0004458 A1 1/2021 Edwards et al.
2021/0064751 A1 3/2021 Li et al.
2021/0084063 A1 3/2021 Triantafillos et al.
2021/0176261 A1 6/2021 Yavo et al.
2021/0182387 A1 6/2021 Zhu et al.
2021/0209228 A1 7/2021 Maor et al.
2021/0224676 A1 7/2021 Arzani et al.
2021/0248503 A1 8/2021 Hickey et al.
2021/0264028 A1 8/2021 Genc et al.
2021/0266339 A1 8/2021 Moshitzky et al.
2021/0273958 A1 9/2021 McLean
2021/0286877 A1 9/2021 Vijayvargiya et al.
2021/0304204 A1 9/2021 Ramesh et al.
2021/0400070 A1 12/2021 Ackerman et al.
2022/0086178 A1 3/2022 Jayamohan et al.

(56) References Cited

U.S. PATENT DOCUMENTS

| | | | | |
|---|---|---|---|---|
| 2022/0129551 | A1 | 4/2022 | Collier et al. | |
| 2022/0138856 | A1 | 5/2022 | Ahlstrom et al. | |
| 2022/0217156 | A1 | 7/2022 | Wahbo | |
| 2022/0217166 | A1 | 7/2022 | Ladnai et al. | |
| 2023/0007023 | A1 | 1/2023 | Andrabi et al. | |
| 2023/0026385 | A1 | 1/2023 | Zhang et al. | |
| 2023/0075355 | A1 | 3/2023 | Twigg | H04L 67/306 |
| 2023/0114821 | A1 | 4/2023 | Thomas et al. | |
| 2023/0117120 | A1 | 4/2023 | Johnson | |
| 2023/0117268 | A1 | 4/2023 | Rimer et al. | |
| 2023/0129144 | A1 | 4/2023 | Neil | H04L 63/145 726/23 |
| 2023/0164039 | A1 | 5/2023 | Vadlamani | |
| 2023/0164162 | A1 | 5/2023 | Lee et al. | |
| 2023/0171235 | A1 | 6/2023 | Chhibber et al. | |
| 2023/0224311 | A1 | 7/2023 | Meshi et al. | |
| 2023/0229771 | A1 | 7/2023 | Sameer et al. | |
| 2023/0247048 | A1 | 8/2023 | Samosseiko et al. | |
| 2023/0269256 | A1 | 8/2023 | Allon et al. | |
| 2023/0403294 | A1 | 12/2023 | Bazalgette et al. | |
| 2024/0095350 | A1 | 3/2024 | Withnell et al. | |
| 2024/0126910 | A1 | 4/2024 | Johnson et al. | |
| 2024/0211597 | A1 * | 6/2024 | Loman | G06F 21/566 |
| 2024/0289461 | A1 | 8/2024 | Ko et al. | |
| 2024/0303529 | A1 | 9/2024 | Rane et al. | |
| 2024/0338489 | A1 | 10/2024 | Zhu et al. | |
| 2024/0340306 | A1 | 10/2024 | Staab | |
| 2024/0378423 | A1 | 11/2024 | Gunnai et al. | |
| 2024/0380766 | A1 | 11/2024 | Shachar et al. | |
| 2024/0386015 | A1 | 11/2024 | Crabtree | G06F 16/9024 |
| 2024/0414178 | A1 | 12/2024 | Neuvirth-Telem et al. | |
| 2025/0007882 | A1 | 1/2025 | Akhtar et al. | |
| 2025/0094585 | A1 | 3/2025 | Wuest et al. | |
| 2025/0173431 | A1 | 5/2025 | Divakaran et al. | |
| 2025/0181718 | A1 | 6/2025 | Saqib et al. | |
| 2025/0217479 | A1 | 7/2025 | Palanki | |
| 2025/0247402 | A1 | 7/2025 | Singla | |
| 2025/0260712 | A1 | 8/2025 | Hong et al. | |

FOREIGN PATENT DOCUMENTS

| | | | | |
|---|---|---|---|---|
| CN | 101536455 | A | 9/2009 | |
| CN | 103561048 | A | 2/2014 | |
| CN | 106131050 | A | 11/2016 | |
| CN | 114640507 | * | 6/2022 | |
| CN | 114640507 | A * | 6/2022 | H04L 63/1425 |
| CN | 109104395 | A | 8/2022 | |
| CN | 115396324 | A | 11/2022 | |
| CN | 116074031 | * | 5/2023 | |
| EP | 0952521 | A2 | 10/1999 | |
| EP | 2056559 | A1 | 5/2009 | |
| GB | 0401420 | | 2/2004 | |
| JP | 2004046742 | A | 2/2004 | |
| JP | 2009111448 | A | 5/2009 | |
| JP | 2021523451 | A | 9/2021 | |
| WO | 03083660 | A1 | 10/2003 | |
| WO | 2015149062 | A1 | 10/2015 | |
| WO | 2020100284 | A1 | 5/2020 | |

OTHER PUBLICATIONS

Asrigo et al., “Using VMM-based sensors to monitor honeypots,” Proceedings of the 2nd International Conference on Virtual Execution Environments, pp. 13-23, Jun. 14, 2006.

Bhuyan et al., “Surveying Port Scans and Their Detection Methodologies”, Computer Journal, vol. 54, No. 10. pp. 1565-1581, Apr. 20, 2011.

Skormin, “Anomaly-Based Intrusion Detection Systems Utilizing System Call Data”, Watson School of Engineering at Binghamton University, pp. 1-82, Mar. 1, 2012.

Palo Alto Networks, “Cortex XDR”, datasheet, pp. 1-7, year 2020.

Palo Alto Networks, “WildFire”, datasheet, pp. 1-6, year 2020.

Barford et al., “Characteristics of Network Traffic Flow Anomalies,” Proceedings of the 1st ACM SIGCOMM Workshop on Internet Measurement, pp. 69-73, year 2001.

AU Application # 2022370400 Office Action dated Jun. 12, 2024.

International Application # PCT/IB2024/052646 Search Report dated Jun. 14, 2024.

U.S. Appl. No. 17/676,275 Office Action dated Sep. 6, 2024.

Du et al., “AutoCombo: Automatic Malware Signature Generation Through Combination Rule Mining,” Proceedings of CIKM ’21, Virtual Event, Association for Computing Machinery, pp. 1-10, Nov. 2021.

Dropzone AI, “10X SOC Team Multiplier,” AI Solutions Guide, pp. 1-4, year 2024, as downloaded from https://www.dropzone.ai/solution-sheets/dropzone-ai-solution-guide.

Dijkstra, “A Note on Two Problems in Connexion with Graphs,” Numerische Mathematik 1, pp. 269-271, year 1959.

U.S. Appl. No. 17/676,275 Office Action dated Feb. 29, 2024.

Light Cyber Ltd, “LightCyber Magna”, pp. 1-3, year 2011.

TIER-3 Pty Ltd, “Huntsman Protector 360”, Brochure, pp. 1-2, Apr. 1, 2010.

TIER-3 Pty Ltd, “Huntsman 5.7 The Power of 2”, Brochure, pp. 1-2, Oct. 8, 2012.

Bilge et at., “Disclosure: Detecting Botnet Command and Control Servers Through Large-Scale NetFlow Analysis”, ACSAC, pp. 1-10, Dec. 3-7, 2012.

Blum., “Combining Labeled and Unlabeled Data with Co-Training”, Carnegie Mellon University, Research Showcase @ CMU, Computer Science Department, pp. 1-11, Jul. 1998.

Felegyhazi et al., “On the Potential of Proactive Domain Blacklisting”, LEET’10 Proceedings of the 3rd USENIX Conference on Large-scale exploits and emergent threats, pp. 1-8, San Jose, USA, Apr. 27, 2010.

Frosch., “Mining DNS-related Data for Suspicious Features”, Ruhr Universitat Bochum, Master’sThesis, pp. 1-88, Dec. 23, 2011.

Bilge at al., “Exposure: Finding Malicious Domains Using Passive DNS Analysis”, NDSS Symposium, pp. 1-17, Feb. 6-9, 2011.

Gross et al., “FIRE: Finding Rogue Networks”, Annual Conference on Computer Security Applications (ACSAC’09), pp. 1-10, Dec. 7-11, 2009.

Markowitz, N., “Bullet Proof Hosting: A Theoretical Model”, Security Week, [pp. 1-5, Jun. 29, 2010, downloaded from http://www.infosecisland.com/blogview/4487-Bullet-Proof-Hosting-A-Theoretical-Model.html.

Konte et al., “ASwatch: An AS Reputation System to Expose Bulletproof Hosting ASes”, SIGCOMM , pp. 625-638, Aug. 17-21, 2015.

Markowitz, N., “Patterns of Use and Abuse with IP Addresses”, Security Week, pp. 1-4, Jul. 10, 2010, downloaded from http://infosecisland.com/blogview/5068-Patterns-of-Use-and-Abuse-with-IP-Addresses.html.

Wei et al., “Identifying New Spam Domains by Hosting IPs: Improving Domain Blacklisting”, Department of Computer and Information Sciences, University of Alabama at Birmingham, USA, pp. 1-8, Dec. 8, 2010.

Goncharov, M., “Criminal Hideouts for Lease: Bulletproof Hosting Services”, Forward-Looking Threat Research (FTR) Team, A TrendLabsSM Research Paper, pp. 1-28, Jul. 3, 2015.

U.S. Appl. No. 17/505,673 Office Action dated Sep. 25, 2023.

U.S. Appl. No. 17/700,579 Office Action dated Oct. 13, 2023.

AU Application # 2021351215 Office Action dated Nov. 28, 2023.

“PA-3250 Next Generation Firewall,” PS-3200 Series, Datasheet, Palo Alto Networks, Inc., Santa Clara, CA, USA, pp. 1-4, year 2021.

“What is PCI DSS?” Palo Alto Networks, Cyberpedia, pp. 1-5, year 2021, as downloaded from https://www.paloaltonetworks.com/cyberpedia/what-is-a-pci-dss.

Wikipedia, “Active Directory,” pp. 1-14, last edited Oct. 2021.

Xu, “Correlation Analysis of Intrusion Alerts,” Dissertation in Computer Science submitted to the Graduate Faculty, North Carolina State University, pp. 1-206, year 2006.

Brownlee et al., “Traffic Flow Measurement: Architecture,” Request for Comments 2722, Network Working Group, pp. 1-48, Oct. 1999.

U.S. Appl. No. 17/571,558 Office Action dated Jun. 26, 2023.

(56) References Cited

OTHER PUBLICATIONS

Palo Alto Networks, Inc., "Cortex Xsoar—Redefining Security Orchestration and Automation," product Information, pp. 1-2, year 2020.
Niksun, "Network Intrusion Forensic System (NIFS) for Intrusion Detection and Advanced Post Incident Forensics", Whitepaper, pp. 1-12, Feb. 15, 2010.
Shulman, A., "Top Ten Database Security Threats How to Mitigate the Most Significant Database Vulnerabilities", White Paper, pp. 1-14, year 2006.
U.S. Appl. No. 18/361,850 Office Action dated Jun. 3, 2025.
U.S. Appl. No. 17/676,275 Office Action dated Jun. 16, 2025.
U.S. Appl. No. 18/357,121 Office Action dated May 2, 2025.
Khosravi et al, "Alerts Correlation and Causal Analysis for APT Based Cyber Attack Detection," IEE Access, vol. 8, pp. 162642-162656, year 2020.
Final Office Action for U.S. Appl. No. 18/357,121, dated Oct. 23, 2025.
Notice of References Cited for U.S. Appl. No. 18/357,121, dated Oct. 23, 2025.
Non-Final Office Action for U.S. Appl. No. 18/661,626, dated Oct. 1, 2025.
Notice of References Cited for U.S. Appl. No. 18/661,626, dated Oct. 1, 2025.
Non-Final Office Action for U.S. Appl. No. 18/783,523, dated Oct. 21, 2025.
Notice of References Cited for U.S. Appl. No. 18/783,523, dated Oct. 21, 2025.
Non-Final Office Action for U.S. Appl. No. 18/731,420, dated Oct. 2, 2025.
Notice of References Cited for U.S. Appl. No. 18/731,420, dated Oct. 2, 2025.
Final Office Action for U.S. Appl. No. 18/361,850, dated Sep. 30, 2025.
Notice of References Cited for U.S. Appl. No. 18/361,850, dated Sep. 30, 2025.
Decision on Appeal (Appeal 2024-003437) for U.S. Appl. No. 17/700,579, dated Jul. 30, 2025.
Non-Final Office Action for U.S. Appl. No. 18/499,256, dated Aug. 18, 2025.
Search Report, Chinese Application No. 202310649492.6, dated Jul. 21, 2025.
Notice of References Cited for U.S. Appl. No. 18/322,231, dated Sep. 30, 2025.
Australian Application No. 2022441431, Examination report No. 1 dated Jul. 3, 2025.
Second Office Action, Chinese Application No. 202310649426.9, dated Sep. 16, 2025.
First Office Action, Chinese Application No. 202310649332.1, dated Aug. 6, 2025.
Search Report, Chinese Application No. 202310649332.1, dated Aug. 4, 2025.
First Office Action, Chinese Application No. 202310649492.6, dated Jul. 24, 2025.
Non-Final Office Action U.S. Appl. No. 18/361,850, dated Dec. 30, 2025.
U.S. Appl. No. 18/361,850, dated Dec. 30, 2025.

* cited by examiner

20
INTERFACE
PROCESSOR
30
32
28
24
INTERNET
26
22
INTERFACE
PROCESSOR
MEMORY
34
36
38
PAGE-EXECUTING FUNCTION
SENSITIVE FUNCTIONS
THREAD-STARTING FUNCTION
QUEUING FUNCTION
H1
H2
H3
H4
40
42
44
46

48
50
PAGE-EXECUTING FUNCTION CALLED TO EXECUTE SERVER-SIDE SCRIPT?
NO
YES
52
ASSOCIATE SCRIPT CONTEXT WITH CURRENT EXECUTION THREAD
54
CALL PAGE-EXECUTING FUNCTION
56
DISASSOCIATE SCRIPT CONTEXT FROM CURRENT EXECUTION THREAD 58
60
IS CURRENT EXECUTION THREAD ASSOCIATED WITH SCRIPT CONTEXT?
NO
YES
62
OUTPUT MESSAGE INCLUDING SCRIPT CONTEXT
64
CALL SENSITIVE FUNCTION

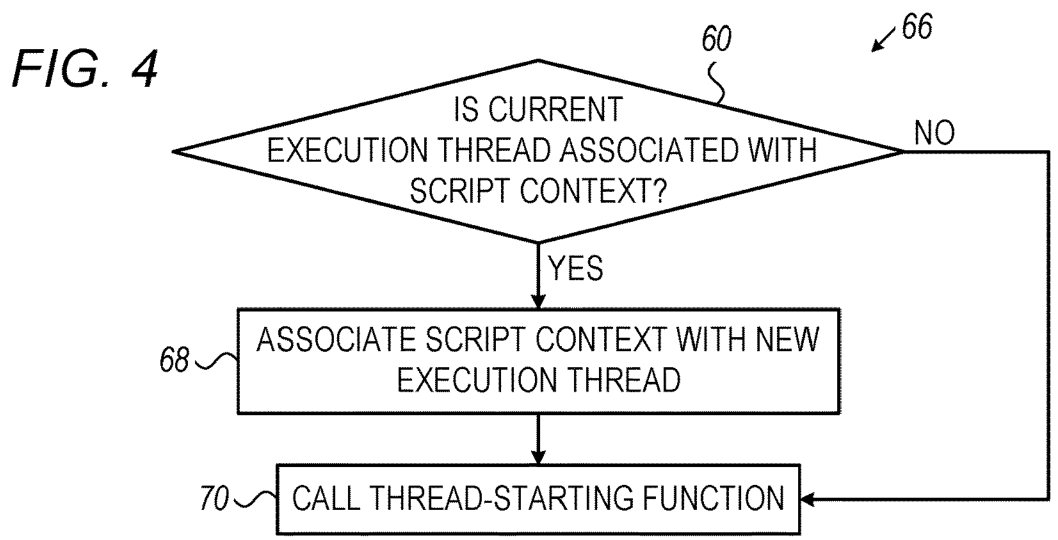
FIG. 4
66
60
IS CURRENT EXECUTION THREAD ASSOCIATED WITH SCRIPT CONTEXT?
NO
YES
68
ASSOCIATE SCRIPT CONTEXT WITH NEW EXECUTION THREAD
70
CALL THREAD-STARTING FUNCTION

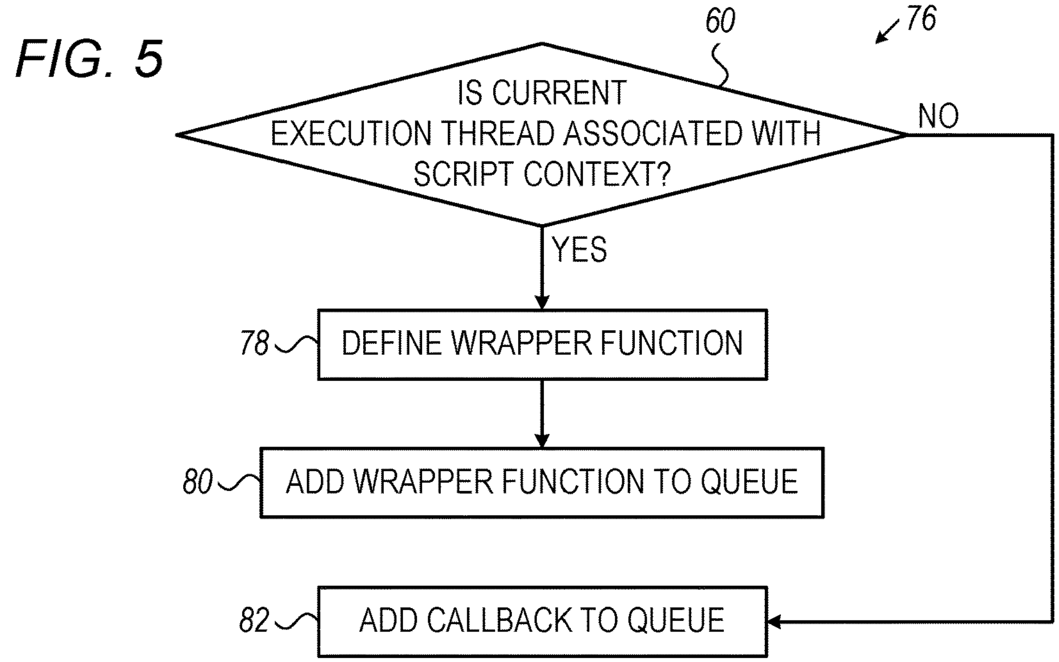
FIG. 5
76
60
IS CURRENT EXECUTION THREAD ASSOCIATED WITH SCRIPT CONTEXT?
NO
YES
78
DEFINE WRAPPER FUNCTION
80
ADD WRAPPER FUNCTION TO QUEUE
82
ADD CALLBACK TO QUEUE

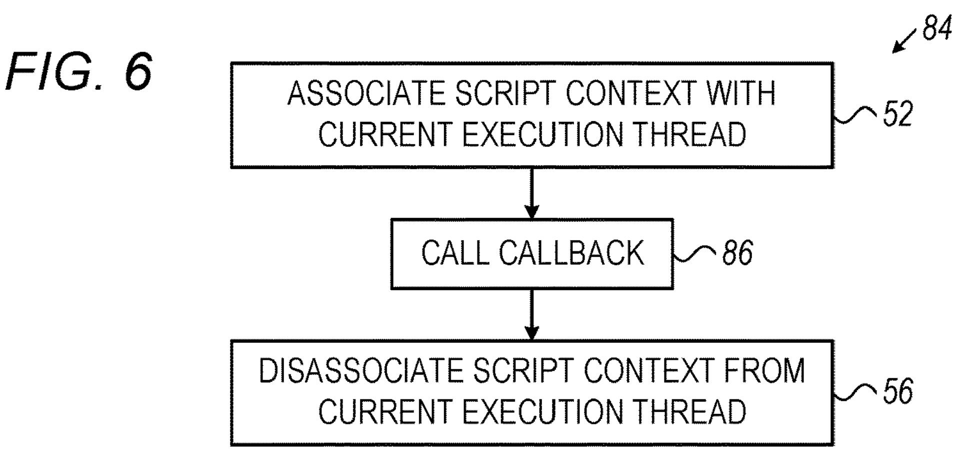
FIG. 6
84
ASSOCIATE SCRIPT CONTEXT WITH CURRENT EXECUTION THREAD
52
CALL CALLBACK
86
DISASSOCIATE SCRIPT CONTEXT FROM CURRENT EXECUTION THREAD
56

DETECTING EXECUTION OF A WEB SHELL

FIELD OF THE INVENTION

The present invention is related to the field of computer security.

BACKGROUND OF THE INVENTION

One type of dynamic web page uses a server-side script to vary the content displayed for different users.

A web shell is an interface allowing remote exploitation of a web server. A web-shell attack on a web server involves creating an illegitimate server-side script for a dynamic web page, or illegitimately modifying an existing server-side script, so as to cause the script to function as a web shell, and then executing the web shell so as to exploit the web server.

The hooking of a function refers to the act of modifying the flow of execution when the function is called. For example, in one type of hooking, the function is wrapped in a hook function including additional functionality. Any time the original function is called from outside the hook, execution is redirected to the hook, such that the additional functionality is carried out.

SUMMARY OF THE INVENTION

There is provided, in accordance with some embodiments of the present invention, a system including a memory and a processor. The memory is configured to store a page-executing function, which is configured to execute a web page on a web server, and one or more sensitive functions. The processor is configured to place a first hook on the page-executing function and a second hook on at least one of the sensitive functions. The first hook is configured to ascertain whether the page-executing function is called to execute a server-side script, and in response to the page-executing function being called to execute a server-side script, associate, with a current execution thread, data associated with the calling of the page-executing function and indicating that the page-executing function is called to execute the server-side script. The second hook is configured to ascertain whether the sensitive function is called from an execution thread associated with the data, and in response to the sensitive function being called from an execution thread associated with the data, output a message including the data.

In some embodiments, the first hook is configured to associate the data with the current execution thread using thread-local storage (TLS).

In some embodiments, the memory is further configured to store a thread-starting function configured to start a new execution thread in response to being called by the current execution thread, and the processor is further configured to place, on the thread-starting function, a third hook configured to:

- ascertain whether the current execution thread is associated with the data, and
- in response to the current execution thread being associated with the data, associate the data with the new execution thread.

In some embodiments, the memory is further configured to store a queuing function configured add a callback to a queue for assignment to another execution thread in a thread pool in response to being called by the current execution thread, and the processor is further configured to place, on the queuing function, a third hook configured to:

- ascertain whether the current execution thread is associated with the data,
- in response to the current execution thread being associated with the data, define a wrapper function configured to:
  - associate the data with the other execution thread, and
  - subsequently to associating the data with the other execution thread, call the callback, and
- add the wrapper function to the queue.

In some embodiments, the second hook is configured to output the message to a security service configured to analyze the data so as to compute a likelihood that the page-executing function was called maliciously.

In some embodiments, the message further includes any arguments with which the sensitive function is called.

There is further provided, in accordance with some embodiments of the present invention, a method including placing a first hook on a page-executing function configured to execute a web page on a web server, and placing a second hook on at least one sensitive function. The first hook is configured to ascertain whether the page-executing function is called to execute a server-side script, and in response to the page-executing function being called to execute a server-side script, associate, with a current execution thread, data associated with the calling of the page-executing function and indicating that the page-executing function is called to execute the server-side script. The second hook is configured to ascertain whether the sensitive function is called from an execution thread associated with the data, and in response to the sensitive function being called from an execution thread associated with the data, output a message including the data.

There is provided, in accordance some further with embodiments of the present invention, a computer software product including a tangible non-transitory computer-readable medium in which program instructions are stored. The instructions, when read by a processor, cause the processor to place a first hook on a page-executing function configured to execute a web page on a web server, and to place a second hook on at least one sensitive function. The first hook is configured to ascertain whether the page-executing function is called to execute a server-side script, and in response to the page-executing function being called to execute a server-side script, associate, with a current execution thread, data associated with the calling of the page-executing function and indicating that the page-executing function is called to execute the server-side script. The second hook is configured to ascertain whether the sensitive function is called from an execution thread associated with the data, and in response to the sensitive function being called from an execution thread associated with the data, output a message including the data.

There is provided, further in accordance with some embodiments of the present invention, a system including a memory and a processor. The memory is configured to store a page-executing function, which is configured to execute a web page on a web server, and at least one sensitive function. The processor is configured to ascertain, upon the page-executing function being called, whether the page-executing function is called to execute a server-side script, and in response to the page-executing function being called to execute a server-side script, associate, with a current execution thread, data associated with the calling of the page-executing function and indicating that the page-executing function is called to execute the server-side script. The processor is further configured to ascertain, upon the sensitive function being called, whether the sensitive function is called from an execution thread associated with the data, and in response to the sensitive function being called from an execution thread associated with the data, output a message including the data.

There is further provided, in accordance with some embodiments of the present invention, a method including, upon a page-executing function, which is configured to execute a web page on a web server, being called, ascertaining whether the page-executing function is called to execute a server-side script. The method further includes, in response to the page-executing function being called to execute a server-side script, associating, with a current execution thread, data associated with the calling of the page-executing function and indicating that the page-executing function is called to execute the server-side script. The method further includes, upon a sensitive function being called, ascertaining whether the sensitive function is called from an execution thread associated with the data. The method further includes, in response to the sensitive function being called from an execution thread associated with the data, outputting a message including the data.

The present invention will be more fully understood from the following detailed description of embodiments thereof, taken together with the drawings, in which:

BRIEF DESCRIPTION OF THE DRAWINGS

FIGS. 2-5 are flow diagrams for functionality carried out by various function hooks, in accordance with some embodiments of the present invention; and FIG. 6 is a flow diagram for functionality carried out by a wrapper function, in accordance with some embodiments of the present invention.

DETAILED DESCRIPTION

Overview

In general, it may be challenging to detect a web-shell attack while the attack is in progress.

To address this challenge, embodiments of the present invention cleverly utilize at least two strategically-placed hooks, which work together so as to identify instances of a possible web-shell attack.

The first hook is placed on the function that executes a web page in response to a request. The hook checks if the request is for a dynamic execution using a server-side script, and if so, flags the current execution thread by storing parameters of the request in association with the thread.

The second hook is placed on one or more "sensitive functions," which—based on an assessment by a human expert or by appropriate software—are more likely than other functions to be exploited in a web-shell attack. This hook checks whether the current execution thread, which called the sensitive function, is flagged, indicating that the sensitive function may have been called via execution of a server-side script by the page-executing function. If yes, the hook generates an alert indicating a possible web-shell attack. The alert typically includes the parameters of the request stored by the first hook, and may additionally include any arguments passed to the sensitive function.

In some embodiments, additional hooks are placed on functions that facilitate transferring execution to another execution thread, such as a new thread or a thread in a thread pool. Each of these hooks is configured to check whether the current execution thread is flagged, and if so, to copy the parameters of the request stored by the first hook to the other execution thread to which execution is transferred.

Embodiments of the present invention are applicable to any type of web server configured to deliver dynamic content via a server-side script. The script may be written in any suitable scripting language such as Common Gateway Interface (CGI), Active Server Pages (ASP), Active Server Pages Extended (ASPX), Hypertext Preprocessor (PHP), Java Server Pages (JSP), Node.js, Django, or Ruby on Rails. The script may include statically-compiled code, just-in-time (JIT) compiled code, or interpreted code. Examples of suitable languages for such code include C#, VB.NET, JavaScript, Perl, and Python.

System Description

Figure 1:
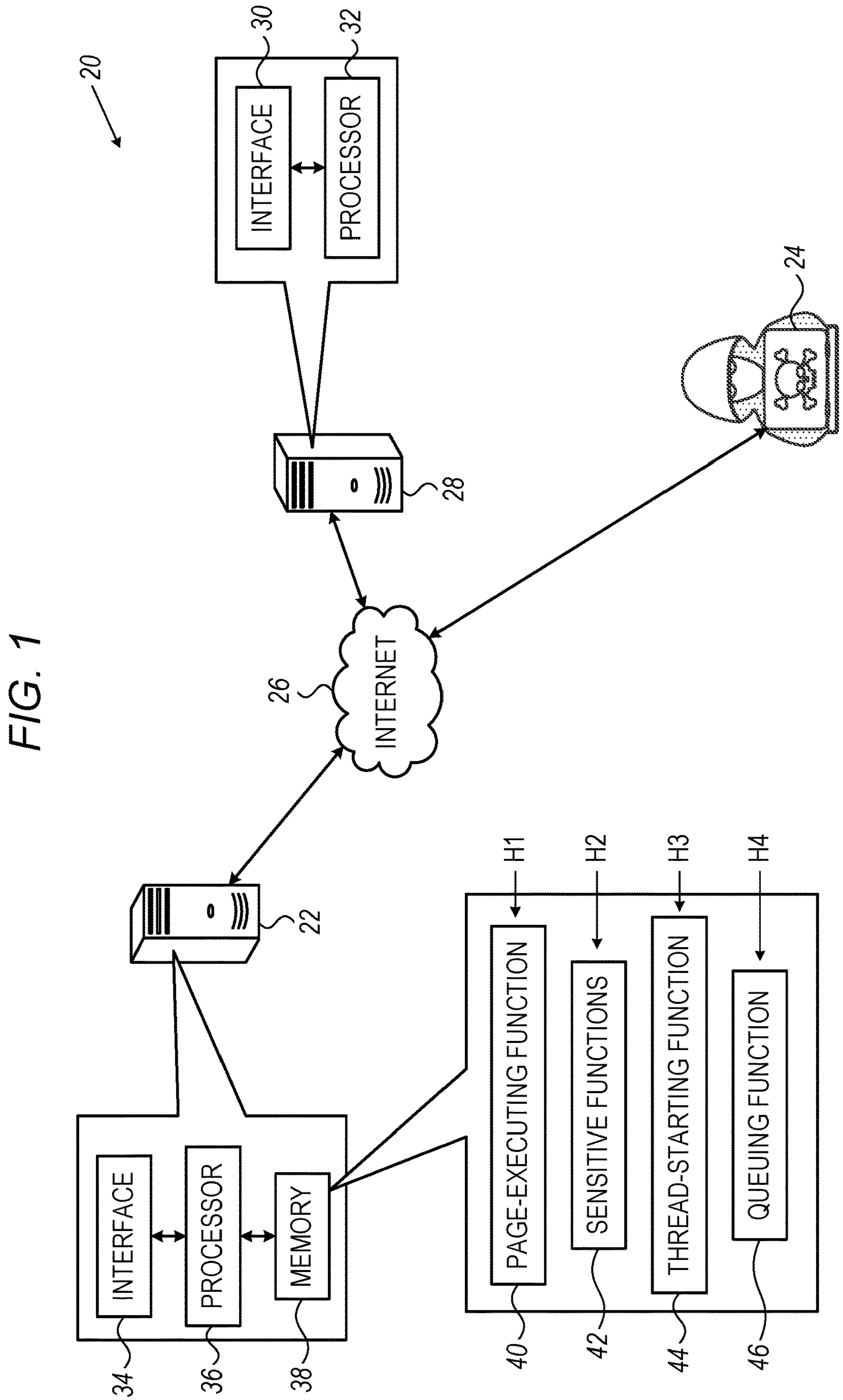
FIG. 1 is a schematic illustration of a computer-security system, in accordance with some embodiments of the present invention.

Reference is initially made to FIG. 1, which is a schematic illustration of a computer-security system 20, in accordance with some embodiments of the present invention. As described in detail below, system 20 is configured to detect possible web-shell attacks launched (automatically or manually) using an attacking device 24 over a computer network 26, such as the Internet.

System 20 comprises a web server 22. Web server 22 comprises a network interface 34, comprising a network interface card (NIC) for example, and a processor 36. Web server 22 further comprises a volatile memory 38, comprising a random access memory (RAM) for example, in which program instructions are loaded for execution by processor 36.

Processor 36 is configured to execute a web page in response to requests passed over network 26 and received via network interface 34. Typically, the requests are in accordance with the Hypertext Transfer Protocol (HTTP) or HTTP Secure (HTTPS).

In particular, each request includes a call to a page-executing function 40, which is stored (non-persistently) in memory 38. In response to receiving the request, processor 36 executes page-executing function 40 so as to execute the web page.

Typically, page-executing function 40 calls additional functions stored in memory 38. For example, page-executing function 40 may call (directly or via one or more other functions) one or more sensitive functions 42. Examples of sensitive functions 42 include functions that create a process or object or that evaluate a script, such as the .NET functions Process. Start, ActivexObject.Create, and Eval.JScriptEvaluate. Alternatively or additionally, page-executing function 40 may call (directly or via one or more other functions) a thread-starting function 44, such as the .NET function Thread. Start, which starts a new execution thread (i.e., causes the new execution thread to begin execution) in response to being called by the current execution thread. Alternatively or additionally, page-executing function 40 may call (directly or via one or more other functions) a queuing function 46, such as the C++ function QueueUserWorkItem. In response to being called by the current execution thread, queuing function 46 adds a callback, which is passed as an argument to the queuing function, to a queue for assignment to another execution thread in a thread pool.

In some embodiments, web server 22 is an Internet Information Services (IIS) web server. In such embodiments, processor 36 may run an IIS worker process (w3wp.exe) so as to handle the aforementioned requests, and page-executing function 40 may include the .NET IHttpHandler.ProcessRequest or DefaultHttpHandler.BeginProcess-Request functions, for example.

Optionally, the request may call page-executing function 40 to execute a server-side script, e.g., by passing the name of the file containing the script as an argument to the function. For example, on an IIS web server, the request may specify an Active Server Pages Extended (ASPX) file for execution.

Optionally, processor 36 may be embodied as a cooperatively networked or clustered set of processors. For example, the functionality of web server 22 may be distributed over multiple servers comprising different respective network interfaces and processors.

System 20 further comprises at least one security server 28 comprising a network interface 30, comprising a NIC for example, and a processor 32. Processor 32 is configured to communicate, via network interface 30, with web server 22 over network 26. In particular, processor 32 is configured to provide a security-software download (e.g., in the form of an installation package) to web server 22, the security software being configured to modify pre-existing software on the web server as further described below. Processor 32 is further configured to receive, from the web server, any communication generated by virtue of these modifications.

Processor 32 is further configured to execute a security service, typically cooperatively with processor 36. The security service is configured to identify potential web-shell attacks on web server 22, as further described below with reference to FIG. 3.

Optionally, processor 32 may be embodied as a cooperatively networked or clustered set of processors. For example, the execution of the security service and/or other functionality of security server 28 may be distributed over multiple servers comprising different respective network interfaces and processors.

Typically, the functionality of each of the processors described herein is implemented in software. For example, each of the processors may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Software Modifications

Subsequently to downloading and installing the aforementioned security software, processor 36 executes the security software. The instructions contained in the security software cause processor 36 to place a hook H1 on page-executing function 40 and another hook H2 on at least one of sensitive functions 42. In some embodiments, the instructions also cause processor 36 to place another hook H3 on thread-starting function 44. Alternatively or additionally, the instructions may cause processor 36 to place another hook H4 on queuing function 46.

Typically, the processor hooks (i.e., places a hook on) each of the aforementioned functions by defining a hook function and replacing a pointer to the function with a pointer to the hook function. In particular, for a function written in an interpreted language such as Python, or in a just-in-time (JIT) compiled language such as a .NET JIT compiled language, the new pointer points to the code in which the hook function is written. For a function written in a statically-compiled language such as C++, the new pointer points to the binary instructions that result from compiling the code. By virtue of this pointer replacement, the original function can be called only from within the hook function.

Alternatively, the processor may place an in-line hook on the function, i.e., the processor may change the code or binary instructions of the function.

Typically, the processor hooks the functions in memory 38. In such embodiments, processor 36 may execute the security software, thereby hooking the functions, every time the functions are loaded into memory 38 for execution.

Alternatively, the hooks may be placed in a non-volatile memory (not shown), such as a flash memory, in which the functions are persistently stored.

In some embodiments, reflection is used to locate the functions to be hooked. For example, for web servers based on. NET or Java, the functions may be located using built-in reflection functionality. In other embodiments, such as for web servers based on C++ or Rust (which do not have reflection capabilities), the functions are located by searching the memory for specific instruction sets that are unique to the functions.

Each of the aforementioned hooks is hereby described with reference to the flow diagrams shown in the subsequent figures.

Page-Executing Function Hook

Figure 2:
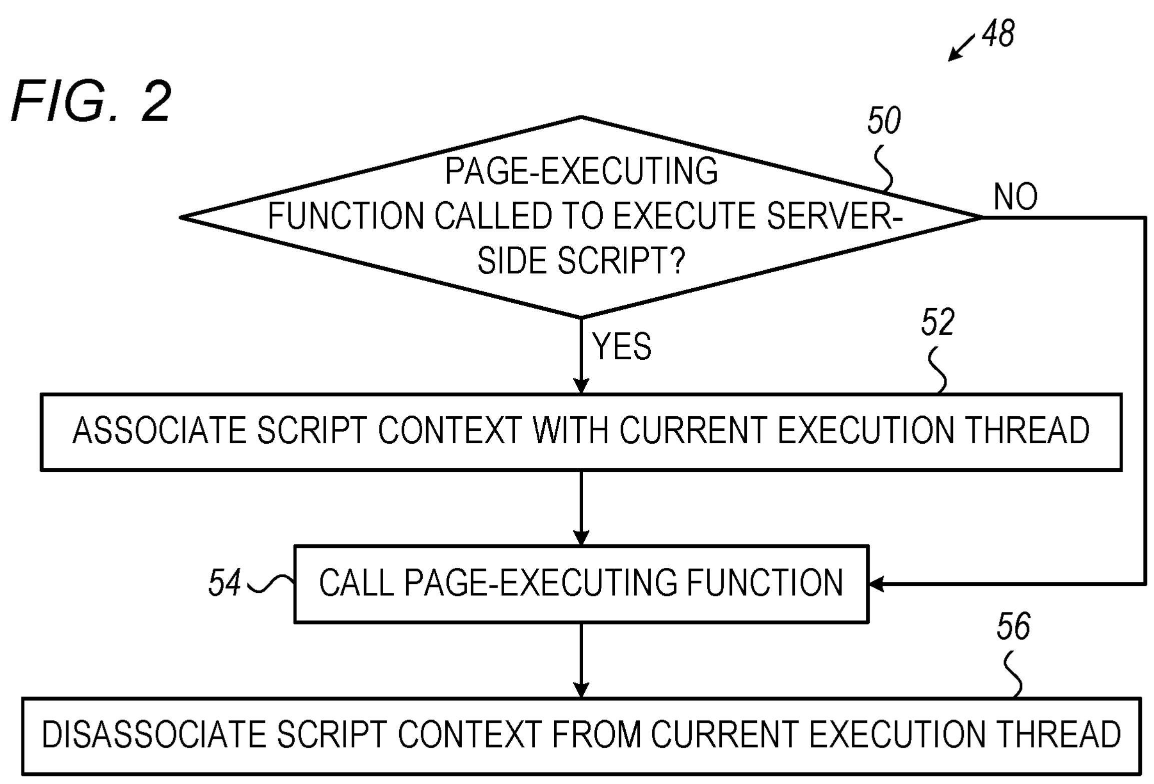

Reference is now made to FIG. 2, which is a flow diagram for functionality 48 carried out by hook H1 (FIG. 1), in accordance with some embodiments of the present invention.

Hook H1 is configured to ascertain, at an ascertaining step 50, whether the page-executing function is called to execute a server-side script, such as an ASPX script. In response to the page-executing function being called to execute a server-side script, the hook carries out an associating step 52, at which the hook associates, with the current execution thread, data associated with the calling of the page-executing function and indicating that the page-executing function is called to execute the server-side script. After associating this data, referred to herein as a "script context," with the current execution thread, or if the page-executing function was not called to execute a server-side script, the hook calls the page-executing function at a function-calling step 54. (Alternatively, if the hook is in-line, the native functionality of the page-executing function is executed.) Finally, at a disassociating step 56, the hook disassociates the script context (if existent) from the current execution thread, which may be different from the execution thread that was current at associating step 52.

As a purely illustrative example, a hook on the C#IHttpHandler.ProcessRequest function may be defined as follows:

```
void ProcessRequestHook(HttpContext Context) {
  If (EndsWith(Context.URL, ".aspx")) {
    SetAspxContextForCurrentThread(Context);
  }
```

-continued

```
        OrigProcessRequest(Context);
        RemoveAspxContextFromCurrentThread( );
    }
```

In this example, when a user passes a request, including an HttpContext object as an argument, to web server 22, processor 36 executes the hook ProcessRequestHook instead of the original ProcessRequest function. Upon execution, the hook first checks if the "URL" variable of the argument ends with ".aspx," indicating that the request specifies an ASPX script for execution. If yes, the hook passes the HttpContext object to another function that sets an ASPX context for the current execution thread, i.e., associates the HttpContext object, or at least some of the data contained therein (including the URL variable), with the current execution thread. Subsequently, the original ProcessRequest function is called with the HttpContext argument. (The function "OrigProcessRequest" references the original ProcessRequest function, as opposed to "ProcessRequest," which references the hook.) Finally, the hook calls a function that removes the ASPX context from the current execution thread, i.e., disassociates the HttpContext data from the current execution thread.

In some embodiments, hook H1 associates the script context with the current execution thread using thread-local storage (TLS). In other words, the hook stores the script context in a portion of memory 38 (FIG. 1) that is allocated to the current execution thread.

Sensitive Function Hook

Figure 3:
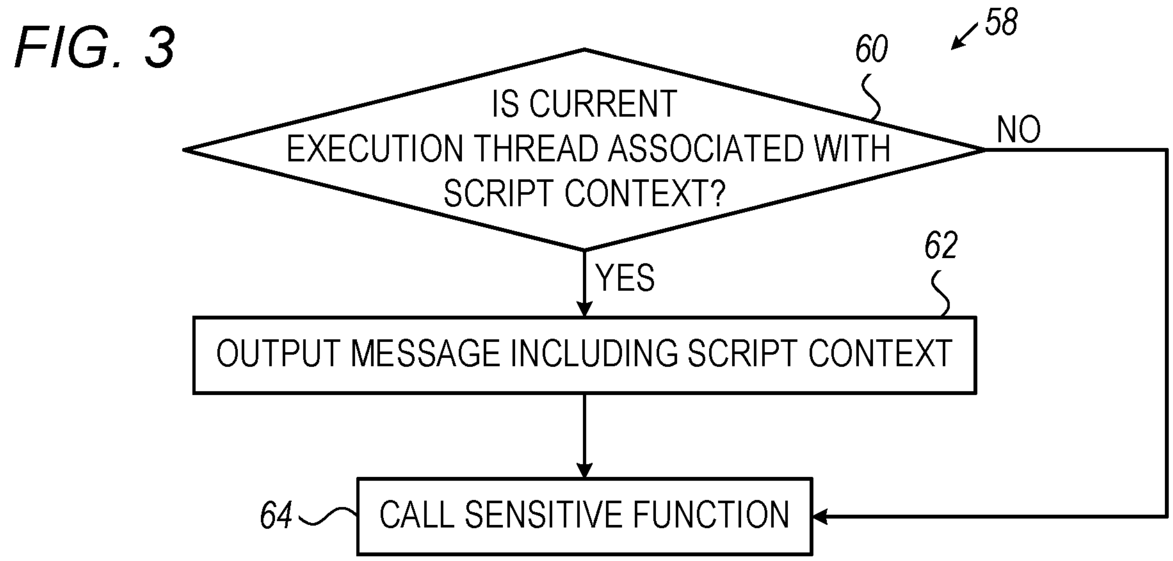

Reference is now made to FIG. 3, which is a flow diagram for functionality 58 carried out by the hook H2 on each hooked sensitive function 42 (FIG. 1), in accordance with some embodiments of the present invention.

Hook H2 is configured to ascertain, at an ascertaining step 60, whether the current execution thread (i.e., the thread from which the sensitive function was called, which may be different from the original thread that began execution of the page-executing function) is associated with a script context. For example, hook H2 may check whether the TLS portion of memory for the current execution thread contains a script context.

If the current execution thread is associated with a script context, hook H2 loads the script context, either while performing ascertaining step 60 (as implied in FIG. 3) or at a separate context-loading step. Subsequently, hook H2 carries out an outputting step 62, at which the hook outputs a message including the script context and, in some embodiments, any arguments with which the sensitive function is called. For example, the hook may output the message to the security service described above with reference to FIG. 1, e.g., by passing the message to an agent installed on web server 22 and configured to execute the security service cooperatively with security server 28, and/or by communicating the message directly to the security server. The security service may then analyze the script context (and, in some embodiments, the arguments with which the sensitive function is called) so as to compute a likelihood that the page-executing function was called maliciously, e.g., during a web-shell attack launched from attacking device 24.

Following outputting step 62, or if the current execution thread is not associated with a script context, hook H2 calls the sensitive function at a function-calling step 64. (Alternatively, if the hook is in-line, the native functionality of function-calling step 64 is executed.)

As a purely illustrative example, a hook on the sensitive .NET Eval.JScriptEvaluate function may be defined as follows:

```
void JScriptEvaluateHook(Params) {
  if (CurrentThreadHasAspxContext( )) {
    var AspxContext = GetAspxContextCurrentThread( );
    ProduceEDREvent(AspxContext, Params);
  }
  OrigJScriptEvaluate(Params);
}
```

In this example, when JScriptEvaluate is called during the processing of the request, the processor executes the hook JScriptEvaluateHook instead of the original JScriptEvaluate function. Upon execution, the hook first checks if the current execution thread has an ASPX context. If yes, the hook loads the ASPX context and then calls the function ProduceEDREvent, which produces an Endpoint Detection and Response (EDR) event by sending an appropriate message to the security service. ProduceEDREvent is called with two arguments: the ASPX context for the current execution thread, and the "Params" argument specified in the call to the sensitive function. Finally, the hook calls the original JScriptEvaluate function with the Params argument.

Thread-Starting Function Hook

Reference is now made to FIG. 4, which is a flow diagram for functionality 66 carried out by optional hook H3 on thread-starting function 44 (FIG. 1), in accordance with some embodiments of the present invention.

Optional hook H3 on thread-starting function 44 is configured to ascertain, at ascertaining step 60, whether the current execution thread (i.e., the thread from which the thread-starting function was called, which may be different from the original thread that began execution of the page-executing function) is associated with a script context. In response to the current execution thread being associated with a script context, hook H3 associates the script context with the new execution thread started by thread-starting function 44, at an associating step 68. For example, for embodiments in which TLS is used, hook H3 may copy the script context from the portion of memory 38 allocated to the current execution thread to the portion of memory 38 allocated to the new execution thread. Subsequently, or if the current execution thread is not associated with a script context, hook H3 calls the thread-starting function at a function-calling step 70. (Alternatively, if the hook is in-line, the native functionality of the thread-starting function is executed.)

As a purely illustrative example, a hook on the .NET Thread.Start function may be defined as follows:

```
void ThreadStartHook( ) {
  if (CurrentThreadHasAspxContext( )) {
    var AspxContext = GetAspxContextCurrentThread( );
    SetAspxContextForThread(this, AspxContext);
  }
  OrigThreadStart( );
}
```

In this example, when the member function Thread. Start is called for a new execution thread, the processor executes the hook ThreadStartHook instead of the original member function. Upon execution, the hook first checks if the current execution thread (i.e., the execution thread that called Thread. Start) has an ASPX context. If yes, the hook loads the ASPX context and then sets the AspxContext for the new thread. (The variable "this" refers to the new thread.) Subsequently, the hook calls the original member method for the new thread.

Alternatively to the function that starts the new execution thread, hook H3 may be placed on the function that creates the new execution thread, such as the C++ function CreateThread.

Queuing Function Hook

Reference is now made to FIG. 5, which is a flow diagram for functionality 76 carried out by optional hook H4 on queuing function 46 (FIG. 1), in accordance with some embodiments of the present invention.

As described above, queuing function 46 is configured to add a callback, which is passed as an argument to the queuing function, to a queue for assignment to another execution thread in a thread pool. Hook H4 is configured to ascertain, at ascertaining step 60, whether the current execution thread (i.e., the thread from which the queuing function was called, which may be different from the original thread that began execution of the page-executing function) is associated with a script context. In response to the current execution thread being associated with a script context, hook H4, at a wrapper-defining step 78, defines a wrapper function that wraps the callback, as described immediately below. Finally, hook H4 adds the wrapper function to the queue at a queuing step 80. Alternatively, if the current execution thread is not associated with a script context, hook H4 adds the callback to the queue at an alternative queuing step 82.

Reference is now made to FIG. 6, which is a flow diagram for functionality 84 carried out by the wrapper function, in accordance with some embodiments of the present invention.

The wrapper function, which may also be viewed as a dynamic hook on the callback, is configured to carry out associating step 52 so as to associate the script context with whichever execution thread the wrapper function is assigned to. For example, for embodiments using TLS, the wrapper function may copy the script context as described above for hook H3. Subsequently to performing this association, the wrapper function calls the callback at a callback-calling step 86. Finally, the wrapper function carries out disassociating step 56.

As a purely illustrative example, the following pseudocode defines a hook on a function "QueueWorkItem," which assigns a callback workItem to a thread pool queue:

```
QueueWorkItemHook(workItem) {
  if (CurrentThreadHasAspxContext( )) {
    var AspxContext = GetAspxContextCurrentThread( );
    newWorkItem = new lambda( ) {
      SetAspxContextForCurrentThread(AspxContext);
      OrigWorkItem( );
      RemoveAspxContextFromCurrentThread( );
    }
    workItem = newWorkItem;
  }
  QueueWorkItem(workItem);
}
```

In this example, when QueueWorkItem is called to queue the callback workItem during the processing of the request, the processor executes the hook QueueWorkItemHook instead of the original QueueWorkItem function. Upon execution, the hook first checks if the current execution thread has an ASPX context. If yes, the hook defines a wrapper function newWorkItem, which wraps the original workItem function as described immediately below. Subsequently, the hook assigns newWorkItem to the variable workItem. Finally, the hook calls the original QueueWorkItem function with the variable workItem as an argument.

Following the assignment of the wrapper function to an execution thread from the pool, the wrapper function is executed. Upon execution, the wrapper function first sets the ASPX context for the execution thread, e.g., by copying the ASPX context to the appropriate TLS portion of memory. Next, the wrapper function calls the original workItem function. Finally, the wrapper function removes the ASPX context from the thread.

Thus, advantageously, hooks H3 and H4 facilitate the identification, by hook H2, of a malicious calling of a sensitive function, even if the sensitive function is called from a thread different from the original thread that began execution of the page-executing function.

It is noted that the flow diagrams shown in FIGS. 2-6 are provided by way of example only, and that the scope of the present invention includes any suitable modification to these flows, including the addition, modification, or omission of one or more steps.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:

a memory, configured to store a page-executing function, which is configured to execute a web page on a web server, and one or more sensitive functions; and a processor, configured to:

place, on the page-executing function, a first hook configured to:

ascertain whether the page-executing function is called to execute a server-side script, and in response to the page-executing function being called to execute a server-side script, associate with a current execution thread, which begins execution of the page-executing function, data associated with the calling of the page-executing function and indicating that the page-executing function is called to execute the server-side script, and place, on at least one of the sensitive functions, a second hook configured to:

ascertain whether the sensitive function is called from an execution thread associated with the data, and in response to the sensitive function being called from an execution thread associated with the data, output a message including the data.

2. The system according to claim 1, wherein the first hook is configured to associate the data with the current execution thread using thread-local storage (TLS).

3. The system according to claim 1, wherein the memory is further configured to store a thread-starting function configured to start a new execution thread in response to being called by the current execution thread, and wherein the processor is further configured to place, on the thread-starting function, a third hook configured to:

ascertain whether the current execution thread is associated with the data, and in response to the current execution thread being associated with the data, associate the data with the new execution thread.

4. The system according to claim 1, wherein the memory is further configured to store a queuing function configured add a callback to a queue for assignment to another execution thread in a thread pool in response to being called by the current execution thread, and wherein the processor is further configured to place, on the queuing function, a third hook configured to:

ascertain whether the current execution thread is associated with the data, in response to the current execution thread being associated with the data, define a wrapper function configured to:

associate the data with the other execution thread, and subsequently to associating the data with the other execution thread, call the callback, and add the wrapper function to the queue.

5. The system according to claim 1, wherein the second hook is configured to output the message to a security service configured to analyze the data.

6. The system according to claim 1, wherein the message further includes any arguments with which the sensitive function is called.

7. A method, comprising:

placing a first hook on a page-executing function configured to execute a web page on a web server, the first hook being configured to:

ascertain whether the page-executing function is called to execute a server-side script, and in response to the page-executing function being called to execute a server-side script, associate with a current execution thread, which begins execution of the page-executing function, data associated with the calling of the page-executing function and indicating that the page-executing function is called to execute the server-side script; and placing a second hook on at least one sensitive function, the second hook being configured to:

ascertain whether the sensitive function is called from an execution thread associated with the data, and in response to the sensitive function being called from an execution thread associated with the data, output a message including the data.

8. The method according to claim 7, wherein the first hook is configured to associate the data with the current execution thread using thread-local storage (TLS).

9. The method according to claim 7, further comprising placing a third hook on a thread-starting function configured to start a new execution thread in response to being called by the current execution thread, the third hook being configured to:

ascertain whether the current execution thread is associated with the data, and in response to the current execution thread being associated with the data, associate the data with the new execution thread.

10. The method according to claim 7, further comprising placing a third hook on a queuing function configured to add a callback to a queue for assignment to another execution thread in a thread pool in response to being called by the current execution thread, the third hook being configured to:

ascertain whether the current execution thread is associated with the data, in response to the current execution thread being associated with the data, define a wrapper function configured to:

associate the data with the other execution thread, and subsequently to associating the data with the other execution thread, call the callback, and add the wrapper function to the queue.

11. The method according to claim 7, wherein the second hook is configured to output the message to a security service configured to analyze the data.

12. The method according to claim 7, wherein the message further includes any arguments with which the sensitive function is called.

13. A computer software product comprising a tangible non-transitory computer-readable medium in which program instructions are stored, which instructions, when read by a processor, cause the processor to:

place a first hook on a page-executing function configured to execute a web page on a web server, the first hook being configured to:

ascertain whether the page-executing function is called to execute a server-side script, and in response to the page-executing function being called to execute a server-side script, associate with a current execution thread, which begins execution of the page-executing function, data associated with the calling of the page-executing function and indicating that the page-executing function is called to execute the server-side script, and place a second hook on at least one sensitive function, the second hook being configured to:

ascertain whether the sensitive function is called from an execution thread associated with the data, and in response to the sensitive function being called from an execution thread associated with the data, output a message including the data.

14. The computer software product according to claim 13, wherein the first hook is configured to associate the data with the current execution thread using thread-local storage (TLS).

15. The computer software product according to claim 13, wherein the instructions further cause the processor to place a third hook on a thread-starting function configured to start a new execution thread in response to being called by the current execution thread, the third hook being configured to:

ascertain whether the current execution thread is associated with the data, and in response to the current execution thread being associated with the data, associate the data with the new execution thread.

16. The computer software product according to claim 13, wherein the instructions further cause the processor to place a third hook on a queuing function configured to add a callback to a queue for assignment to another execution thread in a thread pool in response to being called by the current execution thread, the third hook being configured to:

ascertain whether the current execution thread is associated with the data, in response to the current execution thread being associated with the data, define a wrapper function configured to:

associate the data with the other execution thread, and subsequently to associating the data with the other execution thread, call the callback, and add the wrapper function to the queue.

17. The computer software product according to claim 13, wherein the second hook is configured to output the message to a security service configured to analyze the data.

18. The computer software product according to claim 13, wherein the message further includes any arguments with which the sensitive function is called.

19. A system, comprising:

a memory, configured to store a page-executing function, which is configured to execute a web page on a web server, and at least one sensitive function; and a processor, configured to:

ascertain, upon the page-executing function being called, whether the page-executing function is called to execute a server-side script, in response to the page-executing function being called to execute a server-side script, associate with a current execution thread, which begins execution of the page-executing function, data associated with the calling of the page-executing function and indicating that the page-executing function is called to execute the server-side script, ascertain, upon the sensitive function being called, whether the sensitive function is called from an execution thread associated with the data, and in response to the sensitive function being called from an execution thread associated with the data, output a message including the data.

20. The system according to claim 19, wherein the processor is configured to associate the data with the current execution thread using thread-local storage (TLS).

21. The system according to claim 19, wherein the memory is further configured to store a thread-starting function configured to start a new execution thread in response to being called by the current execution thread, and wherein the processor is further configured to:

ascertain, upon the thread-starting function being called, whether the current execution thread is associated with the data, and in response to the current execution thread being associated with the data, associate the data with the new execution thread.

22. The system according to claim 19, wherein the memory is further configured to store a queuing function configured add a callback to a queue for assignment to another execution thread in a thread pool in response to being called by the current execution thread, and wherein the processor is further configured to:

ascertain, upon the queuing function being called, whether the current execution thread is associated with the data, in response to the current execution thread being associated with the data, define a wrapper function configured to:

associate the data with the other execution thread, and subsequently to associating the data with the other execution thread, call the callback, and add the wrapper function to the queue.

23. The system according to claim 19, wherein the processor is configured to output the message to a security service configured to analyze the data.

24. The system according to claim 19, wherein the message further includes any arguments with which the sensitive function is called.

25. A method, comprising:

upon a page-executing function, which is configured to execute a web page on a web server, being called, ascertaining whether the page-executing function is called to execute a server-side script;

in response to the page-executing function being called to execute a server-side script, associating with a current execution thread, which begins execution of the page-executing function, data associated with the calling of the page-executing function and indicating that the page-executing function is called to execute the server-side script;

upon a sensitive function being called, ascertaining whether the sensitive function is called from an execution thread associated with the data; and in response to the sensitive function being called from an execution thread associated with the data, outputting a message including the data.

26. The method according to claim 25, wherein associating the data with the current execution thread comprises associating the data with the current execution thread using thread-local storage (TLS).

27. The method according to claim 25, further comprising:

upon a thread-starting function, which is configured to start a new execution thread in response to being called by the current execution thread, being called, ascertaining whether the current execution thread is associated with the data; and in response to the current execution thread being associated with the data, associating the data with the new execution thread.

28. The method according to claim 25, further comprising:

upon a queuing function, which is configured to add a callback to a queue for assignment to another execution thread in a thread pool in response to being called by the current execution thread, being called, ascertaining whether the current execution thread is associated with the data;

in response to the current execution thread being associated with the data, defining a wrapper function configured to:

associate the data with the other execution thread, and subsequently to associating the data with the other execution thread, call the callback; and adding the wrapper function to the queue.

29. The method according to claim 25, wherein outputting the message comprises outputting the message to a security service configured to analyze the data.

30. The method according to claim 25, wherein the message further includes any arguments with which the sensitive function is called.

* * * * *